Aug. 21, 1956 R. E. BOULTON 2,759,384
TIRE CHAIN MOUNTING CLIP
Filed April 2, 1953
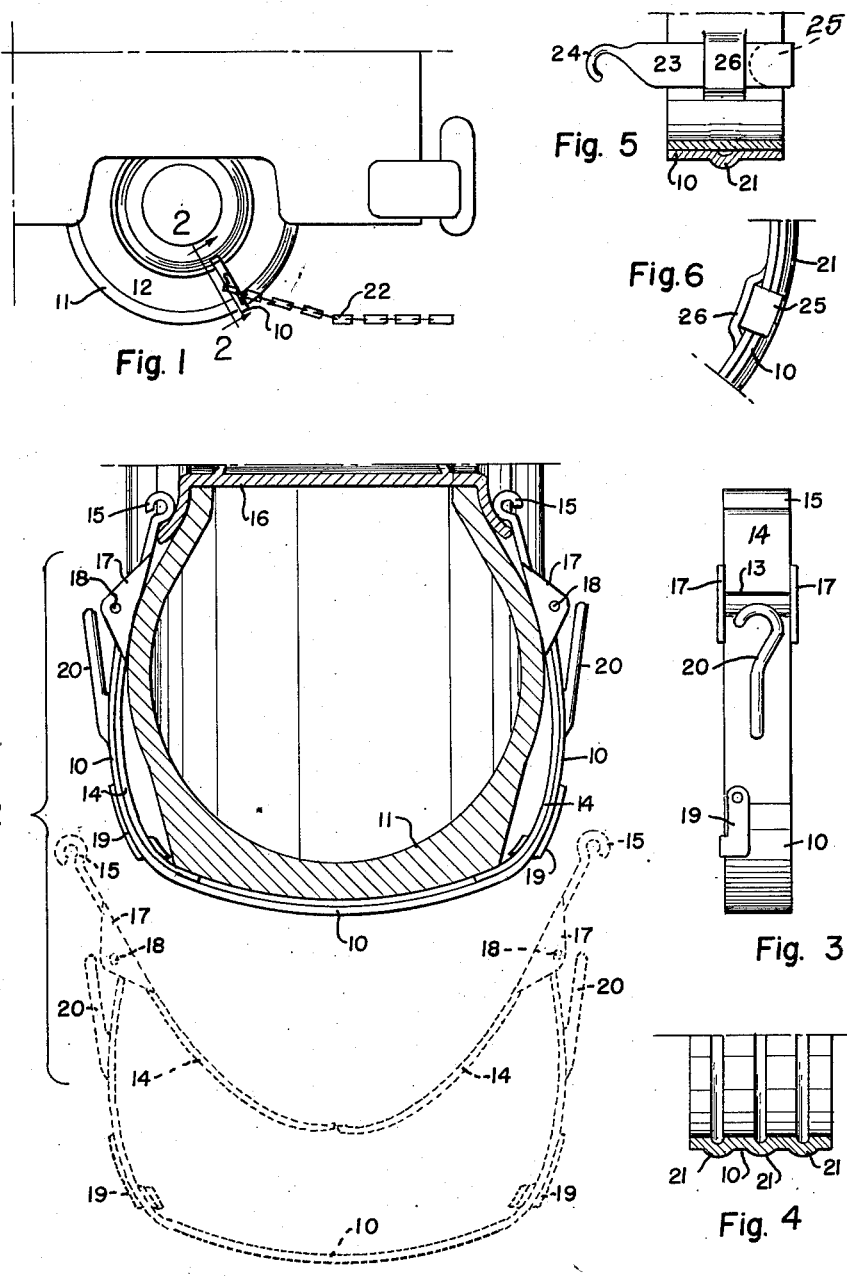
Inventor
ROBERT E. BOULTON
By
Homer G. Sweet
Attorney United States Patent Office 2,759,384
Patented Aug. 21, 1956

2,759,384

TIRE CHAIN MOUNTING CLIP

Robert E. Boulton, Rifle, Colo.

Application April 2, 1953, Serial No. 346,331

2 Claims. (Cl. 81—15.8)

This invention relates to means employable in removable and replaceable association with the usual pneumatic tires of automotive vehicle wheels to facilitate the mounting of conventional anti-skid chains in operative relation thereon, and has as an object to provide a novel and improved clip adapted to be quickly and conveniently clamped in secure embracing relation with any arc of a vehicle tire exposed for ready access.

A further object of the invention is to provide a novel and improved facility adapted for use in the mounting of conventional tire chains in operative relation on an automotive vehicle tire without occasion for elevating the tire away from its engagement with a supporting surface.

A further object of the invention is to provide a novel and improved facility for the mounting of conventional tire chains in operative relation with an automotive vehicle wheel and adapted for practical use when the wheel is devoid of traction in a mud-hole, on a slippery surface, or the like.

A further object of the invention is to provide a novel and improved tire chain mounting clip adapted for secure engagement with and release from an associated tire without occasion for recourse to special tools and adjuncts.

A further object of the invention is to provide a novel and improved tire chain mounting clip successively employable to engage conventional tire chains with any desired number of vehicle wheels.

A further object of the invention is to provide a novel and improved tire chain mounting clip that is simple and inexpensive of production from readily-available material, that is compact and light of weight for convenient storage in a vehicle, that is positive and efficient in attainment of the ends for which designed, and which is convenient and practical of use in a manner obviating many of the use difficulties incident to the employment of tire chains.

With the foregoing and other objects in view, my invention consists in the construction, arrangement, and combination of elements as hereinafter set forth, pointed out in my claims, and illustrated by the accompanying drawing, in which—

Figure 1 is a fragmentary elevation of a typical automotive vehicle wheel wherewith the improvement is associated in position for practical use.

Figure 2 is a cross section, on a relatively enlarged scale, taken substantially on the indicated line 2—2 of Figure 1, the conventional tire chain shown in the latter view being omitted and broken lines indicating a disposition and relaitonship of the improved clip as it is initially approached to the tire.

Figure 3 is an elevation of the left-hand side of the clip shown in Figure 2.

Figure 4 is a fragmentary, detail section through the crown of the improved clip as modified for enhanced rigidity.

Figure 5 is a fragmentary, detail elevation of an alternative hook and latch arrangement as operatively associated with an inner face of the clip shown in the preceding views, broken lines indicating a shifted position of the latch element.

Figure 6 is an elevation of the right-hand side or edge of the arrangement according to Figure 5.

Conventional tire chains constituted as a pair of flexible side members interconnected at intervals by cross chains adapted to transversely embrace the tread of a vehicle tire when the side margins are end coupled at each side of the wheel are extensively utilized to enhance wheel traction and grip relative to the surfaces traversed by the vehicle. The mounting of such chains in operative relation with vehicle wheels is a simple matter when conditions are favorable to elevation of the wheel from a hard, dry, horizontal surface, but even then it is frequently necessary that the one installing the chain must contort through awkward positions between vehicle elements and the supporting surface, with consequent soiling of clothes and possible injury to the person. When mounting of the chains has been delayed until the vehicle is stalled in a mud-hole, snow-bank, or the like, the difficulties and annoyances characterizing mounting of the chains are very much increased, and where the surface supporting the stalled car does not offer a secure foundation for a lifting jack, it may well be that mounting of the chains is entirely impractical, especially when there is no traction effective to roll the vehicle from its stalled condition. Developed to resolve the problems and difficulties of tire chain installation, the device of the present invention is adapted for use under any and all conditions conducive to the use of chains, and is conveniently operable with facility and security on any and every one of the vehicle wheels to operatively dispose and position a tire chain, even when the wheel to be so equipped has lost its tractive effect.

The improved clip is constituted as a generally U-shaped yoke 10 formed from appropriately stiff band or strap metal to snugly engage transversely over and about the tread portion 11 of a conventional pneumatic tire 12, whereby to dispose the base member of the yoke 10 across and against the tire tread surface. The yoke 10 has a depth such as to engage the spaced free ends of the yoke inwardly of the wheel beyond the zone of tire maximum bulge when the base of the yoke is engaged with the tire tread, and the yoke free ends are formed as transverse eyes, or hinge barrels, 13 spaced apart a distance slightly less than the maximum bulge dimension of the tire with which the clip is designed to be used.

A clamp arm 14 is formed from stiff strap or band material similar to, or the same as, that characterizing the yoke 10 and terminates at one end in a traverse, rounded boss 15 while the other end portion of the arm is conformed to nest within and against one of the side members of the yoke 10. At a distance inwardly from the boss 15 appropriate to engage said boss with the concave side margin of the tire mounting rim 16 when the assembled clip is engaged with the base of the yoke 10 against the tire tread 11, apertured ears 17 outstand from opposite side margins of the arm 14 to overlie ends of the yoke eye 13, so that pins 18 engaged through said eyes and the apertures of the ears 17 registered therewith function to pivotally mount an arm 14 on each end of the yoke 10 in an opposed arrangement effective to nest inner ends of said arms within and along the sides of said yoke when the arm bosses 15 are moved inwardly toward each other and to inwardly approach the arm 14 inner end portions away from the yoke sides when said bosses are separated. The inner end portions of the arms 14 extend in overlying relation with the inner face of the yoke 10 sufficiently for engagement against the tire tread 11 when the clip is mounted on the tire, and a latch 19 is pivoted to and exteriorly of each side of the yoke 10 in position to close over and clamp together adjacent margins of the yoke and of the arm 14 closed thereagainst when the clip is swung toward said margins and into the position shown in Figure 3. Completing the mounting clip ready for use, an open hook 20 is fixed exteriorly to and at each side of the yoke 10 to spacedly overlie each yoke eye 13 at its free end, the openings of the hooks 20 being directed toward the same side of the assembly as mounts the latches 19.

The yoke 10 may be formed from material but little yieldable to flexure, in which case flat band or strip forms are entirely practical, but in the interest of lighter weight and lower cost it may be preferred to utilize somewhat flexible material for the yoke 10, in which case the lighter-weight material may be longitudinally ribbed or corrugated, as represented at 21 in Figure 4.

In the use of the improvement, the latches 19 are swung on their pivots to release the inner ends of the arms 14 from the yoke 10 and the bosses 15 are swung to elevate the arm inner ends away from the base of the yoke 10 and into approximately the relation shown by broken lines in Figure 2, in which condition the assembly is approached to the tread 11 of the tire 12 at any rearward arc of the wheel which is accessible. As the assembly is moved radially toward and against the tire tread, engagement of the arms 14 with outer elements of the tire swings said arms toward their seated relation within the yoke and swings the bosses 15 inwardly toward each other until, as the ends of the yoke 10 are sprung over and beyond the maximum tire bulge and the tire tread 11 seats the arm 14 inner ends against the yoke base, the bosses 15 are clamped against the concave margins of the rim 16 as shown in full lines in Figure 2, whereafter the latches 19 are swung on their pivots to engage over and hold the arm 14 inner ends against the yoke, thus securing the unit to and in embracing relation about the tire. The unit is mounted on the tire with the yoke margins carrying the latches 19 directed forwardly with relation to normal wheel rotation, thus to dispose the openings of the hooks 20 in leading relation with forward wheel rotation, and a conventional tire chain 22 is extended in alignment with and rearwardly from the wheel and engaged at the forward ends of its side members with the open hooks 20, so that, as the wheel is caused to rotate forwardly, with or without consequent translation of the vehicle, the mounted clip unit travels with said wheel and carries the chain 22 into mounted relation on and about the tire 12; the ends of the chain side members dropping away from the open hooks 20 as the clip unit passes into and beyond surface engagement with the under arc of the wheel. The chain 22 being in position for use on and with the tire 12, the clip unit may be removed from the tire through opening of the latches 19 and retraction of the yoke 10 radially away from the wheel, whereafter the now-adjacent ends of the tire chain side members may be coupled in a usual manner to complete operative installation of the chain; the mounting clamp being thus freed for use on and with a different vehicle wheel. However, where the situation does not permit access to the tire chain side members for coupling of their ends, it is still feasible to utilize the chain loosely on and about the tire for tractive effect as its engagement with the tire lower arc is adequate to roll the vehicle out of its stalled condition and into a position where the mounting clip may be reused, if desired, to reapply the chain to the wheel.

Alternative to the latch 19 and hook 20 arrangement hereinabove described, the construction according to Figures 5 and 6 may be utilized to accomplish the functions of the elements thereby replaced and to enhance economy and facility of unit production. In the modified construction, the clip assembly comprised from the elements 10, 13, 14, 15, 17 and 18 is the same as that shown and earlier described, except for attachment thereto of the latches 19 and hooks 20. In substitution for the omitted elements 19 and 20, the modification is characterized by a straight bar 23 formed with a hook 24 at one end opening to a side margin of the bar and with its other end hooked to provide a terminal lug 25 spacedly overlying the adjacent bar portion and directed toward the hook 24 in a manner to engage over and about the registered edges of the yoke 10 and an arm 14 seated thereagainst when the bar 23 is disposed against and transversely of the inner face of said arm. A slide loop 26 is struck from each arm 14 inner portion and into offset relation with the arm concave face to slidably receive, position, and retain a bar 23 against and transversely of the associated arm with the hook 24 extending beyond one side margin of the arm and the lug 25 at the other side of the arm in position to engage over the adjacent arm edge and the corresponding edge of the yoke 10 when the arm is closed against the latter. Engaged in and through their slide loops 26 as shown and described, the bars 23 may be shifted longitudinally to project their lugs 25 out of engaging relation with the yoke 10 and to consequently free the arms 14 for oscillation on their hinge pins 18 to facilitate manipulation of the clip unit relative to a tire as above set forth. When the clip unit has been mounted on a tire with its arms 14 seated against the adjacent yoke 10 sides, the bars 23 are shifted to engage their lugs 25 over and about the yoke edges, thus latching the arms to the yoke, and the hooks 24 are disposed for engagement with the tire chain 22 side members for functioning in the same manner as the hooks 20, any tension applied through the chain to the hooks 24 and bars 23 operating to retain the lugs 25 in latching relation with the arm and yoke edges when the unit is mounted with the said hooks trailing in the direction of wheel rotation.

Since the mounting clip unit is adapted for construction in various sizes and particular shapes appropriate for use with particular tires, and since changes in the form, construction, and arrangement of the elements shown and described may be had without departing from the spirit of by invention, I wish to be understood as being limited solely by the scope of the appended claims, rather than by any details of the illustrative showing and foregoing description.

I claim as my invention:

1. A tire chain mounting clip comprising a stiff, U-shaped yoke adapted to fit over and transversely embrace a pneumatic vehicle tire with the yoke base conformably overlying the tire tread, arms hinged between their ends to the free ends of said yoke in substantial alignment with the associated yoke sides to dispose their inner end portions within the yoke for conformable registration at times with and against inner faces of the yoke sides, bosses terminating the ends of said arms remote from the yoke for clamped engagement with the sides of the rim carrying the tire when the arm inner portions are spread to seated relation against the yoke sides, means for latching the inner portions of said arms to and in seated relation against the associated yoke sides, and open hooks at the opposite sides of the yoke for engagement with end links of a conventional tire chain, wherein the means for latching the inner portions of the arms to and in seated relation against the associated yoke sides comprises like latches pivoted to and exteriorly overlying the yoke sides and hooks adjacent the free ends of said latches adapted to embracingly clip over registered side margins of the yoke and an arm portion egaged therewith.

2. A tire chain mounting clip comprising a stiff, U-shaped yoke adapted to fit over and transversely embrace a pneumatic vehicle tire with the yoke base conformably overlying the tire tread, arms hinged between their ends to the free ends of said yoke in substantial alignment with the associated yoke sides to dispose their inner end portions within the yoke for conformable registration at times with and against inner faces of the yoke sides, bosses terminating the ends of said arms remote from the yoke for clamped engagement with the sides of the rim carrying the tire when the arm inner portions are spread to seated relation against the yoke sides, means for latching the inner portions of said arms to and in seated relation against the associated yoke sides, and open hooks at the opposite sides of the yoke for engagement with end links of a conventional tire chain, wherein the open hooks are fixed exteriorly to and adjacent the free ends of the yoke sides and the means for latching the inner portions of the arms to and in seated relation against the associated yoke sides comprises like latches pivoted to and exteriorly overlying the yoke sides and hooks adjacent the free ends of said latches adapted to embracingly clip over registered side margins of the yoke and an arm portion engaged therewith.

References Cited in the file of this patent

UNITED STATES PATENTS

| | | |
|---|---|---|
| 1,426,268 | Flugel | Aug. 15, 1922 |
| 1,540,067 | Grimord et al. | June 2, 1925 |
| 1,574,791 | Clark | Mar. 2, 1926 |
| 1,733,871 | Frank | Oct. 29, 1929 |
| 1,941,935 | Erickson | Jan. 2, 1934 |
| 2,159,626 | Boycott | May 23, 1939 |
| 2,166,869 | Lees et al. | July 18, 1939 |
| 2,440,863 | Liggio | May 4, 1948 |
| 2,608,117 | Gonyea | Aug. 26, 1952 |
| 2,619,857 | McKenna | Dec. 2, 1952 |